Patented Jan. 26, 1943

2,309,463

UNITED STATES PATENT OFFICE 2,309,463

ABRASIVE ARTICLE AND METHOD OF MAKING THE SAME

Robert H. Lombard and Lowell H. Milligan, Worcester, Mass., assignors to Norton Company, Worcester, Mass., a corporation of Massachusetts No Drawing. Application November 23, 1935, Serial No. 51,334

8 Claims. (Cl. 51—293)

The invention relates to diamond abrasive bodies and with regard to its more specific features to grinding wheels in which the abrasive is diamond and the bond is a ceramic bond.

One object of the invention is to provide a grinding wheel of durable characteristics and having excellent cutting qualities. Another object of the invention is to provide a method of bonding diamond particles with a ceramic bond. Another object of the invention is to provide a grinding wheel having extremely hard abrasive particles bonded with a tough and durable bond, and having a relatively porous or open construction. Another object of the invention is to provied a free-cutting wheel of wear resisting qualities. Another object of the invention is to avoid or inhibit oxidation of diamond grain or bort in a mixture thereof with ceramic material while the ceramic material is being vitrified. Another object of the invention is to provide a suitable ceramic for bonding diamond particles. Another object of the invention is to provide a method of making a grinding wheel or similar abrasive article of diamonds and a ceramic bond which is thoroughly practical in actual commercial use. Another object of the invention is to provide a method of bonding diamond granules whereby a strongly adhesive union between the diamond granules and the bond is achieved. Another object of the invention is to provide a method of bonding which shall avoid swelling during firing. Another object of the invention is to provide a grinding wheel composed of diamond abrasive particles and a vitrified ceramic bond. Other objects will be in part obvious or in part pointed out hereinafter.

The invention accordingly consists in the features of construction, combinations of elements, and in the several steps and relation and order of each of said steps to one or more of the others thereof, all as will be illustratively described herein, and the scope of the application of which will be indicated in the following claims.

We provide a quantity of diamond particles, such as the diamond material commonly known as bort. Bort is a word used to indicate comminuted diamond material, such as diamond fragments too small to be of use in the jewelry business and fragments of off-grade diamonds and the like. However, diamond particles of any other type, and from any source may be used in carrying out our invention.

We may use any grain size of diamond particles. In so much as a diamond abrasive wheel is advantageously used to produce a fairly smooth surface on a hard article, in most cases we will use a rather fine grain, for example of the order of 100 mesh grit size.

We provide ceramic materials for forming a vitrified bond. Within the limits of the invention we may use many different ceramic mixes for the bond. We prefer to provide a ceramic material which shall effectively wet the diamond granules. One of the characteristics of diamond is that it is rather difficult to wet. Many softened ceramics will not wet the diamond granules sufficiently to give the desired resultant adhesiveness in the ultimate bond when hardened. Furthermore, we desire to employ a ceramic which is adhesive with respect to diamond granules, so far as this may imply qualities other than wetability.

Diamond grinding wheels are useful for grinding materials so hard that other abrasives give inferior results. As a consequence, a bond for diamond granules to make a grinding wheel preferably is tough and strong; otherwise the bond may wear away too fast and simply release the diamonds. Therefore for the manufacture of grinding wheels for most purposes we prefer a ceramic mix which, in the ultimate bond, is strong and tough, producing a grinding wheel characterized to a high degree by so-called grade hardness.

Many of the ceramics are non-reactive towards diamonds chemically even at high temperatures. We prefer to use one of these, that is to say, we prefer to avoid the use of any ceramic material which, under the conditions used for vitrifying, is chemically reactive towards diamonds. We also prefer such ceramic mixes as soften at temperatures below those which, under the hereinafter specified conditions, might cause graphitization of the diamond granules. Diamond is, so far as now understood, an allotropic form of carbon, and graphite is another allotropic form thereof, and under certain conditions of heat and otherwise, diamond becomes graphite. In so much as graphite is, so far as we are aware, not useful as an abrasive substance per se, we desire to avoid the graphitization of the diamond.

There are many ceramic mixes having all of the above characteristics, or at least enough of them or in sufficient degree, to be useful for the bonding of diamond granules. Therefore it is to be understood that the hereinafter given formula for a ceramic bond for use in accordance with the invention is illustrative only.

Considering now the illustrative example, we take 30 parts of ball clay and 75 parts of a frit according to the following formula, all parts being by weight for convenience:

| | Parts |
|---|---|
| Borax | 32.2 |
| Boric acid | 25.4 |
| Silica | 37.6 |
| Hydrate of alumina | 1.0 |
| Whiting | 3.8 |

This frit may be produced in any manner usual for the production of frits. The frit in liquid phase may be quenched in water, and thereafter the resultant fragments are ground. The calculated chemical composition of this frit is as follows:

| | Per cent |
|---|---|
| $Na_2O$ | 7.3 |
| $CaO$ | 3 |
| $Al_2O_3$ | .9 |
| $B_2O_3$ | 36.4 |
| $SiO_2$ | 52.4 |

Instead of the foregoing ceramic mixture we may use the following:

| | Parts |
|---|---|
| Kentucky #6 ball clay | 15 |
| Ground flint | 15.5 |
| Borax | 19.5 |

For this mixture we might increase the amount of ball clay up to 20; we might increase the amount of flint to 20 parts, and we might reduce the borax to 12 parts. The mixture aforesaid is alumino-boro-silicate glass, when fused. So also is the ceramic of the example first given. One of the characteristics of these ceramics is the property of softening sufficiently for good bonding at a comparatively low temperature. For example, the ceramic of the example first given will soften sufficiently at 925° C. The ceramic of the second example as given will soften at in the neighborhood of 1000° C. Variations of these bonds soften at different temperatures sufficiently, but where the amount of boric oxide and soda is maintained at about the proportions herein before specified, the softening temperatures are generally of the order of 1000° C. and below.

Continuing now with the preferred example of the invention, we take 4 parts, by weight, of diamond bort of 100 mesh grit size, and 1 part by weight of any of the above ceramic mixtures. We add thereto 4% of the whole of a 4% solution of Glutoline. This is a methyl ether of cellulose and it has the properties of plasticising the mass, giving sufficient "green" strength thereto, and it is partially self-combustible. Furthermore it burns out leaving substantially no combustible or otherwise reactive residue. Having achieved excellent results with the use of Glutoline we may nevertheless use any other desired temporary binder, or any plasticiser which produces the desired results.

The ingredients are mixed sufficiently so as to coat each diamond granule with ceramic bond held in place by means of the Glutoline or other temporary binder, whereupon a desired quantity of the mixture is placed in a mold and pressed to the desired shape. A pressure of the order of 6000 lbs. to the square inch may be employed for small articles, although for larger articles or wheels a lesser pressure is satisfactory.

Considering now more particularly the method of vitrifying the bond, we provide a closed furnace of any desired form. We prefer a comparatively impervious or non-porous furnace which can be readily opened and closed for introduction of the articles to be treated, and having suitable connections for the introduction of the desired gases into the furnace and the control thereof. For instance, it is desirous to have an inlet valve and an exhaust valve, whereby a slight flow of gas into the furnace may be maintained during firing in order to keep the atmosphere at the desired concentration in a particular case despite possible leakage or other source of contamination.

We provide any desired type of kiln furniture. This may take the form of bonded alumina refractory plates which will not soften under the temperatures employed in the furnace. Other kiln furniture such as nichrome plates might be employed.

Placing one or a number of the pressed "green" wheels or other abrasive articles on the plate or plates, we introduce it or them into the furnace. We then give the article or articles the following treatment:

Considering now a wheel made with the bond of the example first herein given, we raise the furnace temperature, not too fast, taking a period of an hour and a half more or less depending upon the size of the articles, to reach 500° C. The larger the article being fired the longer the time which may be employed. It may be understood that a longer time may be taken if desired, without detrimental effect. During this first heating stage the atmosphere is ordinary air.

As a result of heating in air to 500° C. the Glutoline or other temporary binder burns. We maintain the temperature around 500° C. for in the neighborhood of half an hour. In the case of large articles we may maintain this temperature for a longer period, for example for an hour in the case of wheels as large as six inches in diameter and two inches thick. A half an hour is a satisfactory time for small wheels of the order of ¾" x ¾" x ⅜". This second heating phase further burns out the Glutoline and is in effect a continuation of the first stage. Glutoline passes off in the form of gases leaving practically nothing but a small ash content which is non-reactive and will not further burn at any temperatures.

At this stage we introduce nitrogen through the inlet valve, exhausting the air through the outlet valve together with whatever gases were formed. We maintain the temperature at 500° C. and, for example, may take half an hour at this temperature passing nitrogen into the furnace in order to remove, so far as possible, all air from the furnace and from the article or articles being treated, as there is a substantial pore space in the articles. The reason for introducing nitrogen is to remove, so far as is possible, all oxygen from around and in contact with the diamond granules.

While maintaining the temperature at 500° C. we now introduce through the inlet valve carbon monoxide. Preferably a substantially pure carbon monoxide should be used. This may take twenty minutes or thereabouts. Enough carbon monoxide is introduced so that the atmosphere in the furnace is substantially carbon monoxide. We now raise the furnace temperature to 925° C., more or less. This, for the small wheel above specified, may take place in an hour and a half, provided the furnace is capable of operating at that speed, it being understood that a longer time may be employed if desired. Having reached the desired high temperature we maintain the furnace at this temperature for four and a half hours or thereabouts. We now allow it to cool.

All during the heating from the time the temperature was raised above 500° C., to the time that it falls again to 500° C., we maintain a carbon monoxide atmosphere. It is preferable as a matter of protection to pass a small amount of gas continuously during this period through the furnace. A small flow of gas will usually suffice. When the temperature has fallen to 500° C. we may turn off the supply of carbon monoxide gas and allow the furnace to cool to room temperature. At any stage substantially below 500° C. we may admit air, so long as precautions are taken not to crack the article by too sudden cooling.

The plasticizing with a temporary binder may, in some cases, be omitted, as we may rely upon the plasticizing nature of the clay or other ceramic material itself, in which case the nitrogen or the carbon monoxide may be present in the furnace during the entire heating stage, if desired.

As a result of softening the ceramic for bonding in a carbon monoxide atmosphere, oxidation of the diamond granules is avoided. Furthermore, in case the bond itself contains some quantity of an oxidizing agent, the carbon monoxide may act to protect the diamonds by reacting with it, and in this respect it acts as a reducing agent. This phase of the method is particularly in connection with ceramic bonds other than those particularly specified, in so much as the bonds specified are not oxidizing bonds and so far as they are concerned we may use a non-oxidizing atmosphere as distinguished from a reducing atmosphere. For example, we may use nitrogen throughout the process, only we prefer that it should be substantially pure. One reason for preferring to use carbon monoxide is that it is difficult to obtain pure nitrogen, that is nitrogen without some small amount of oxygen or other detrimental impurities. Even a small amount of oxygen at the temperatures specified may have sufficient reaction with diamond granules to impair the quality of the final article to some extent. Other non-oxidizing or reducing gases may be used such as argon, helium, and neon, or mixtures of these with any of the others or with carbon monoxide. Those just mentioned are inert gases.

As a result of the foregoing there is formed a ceramic bonded diamond grinding wheel or other abrasive article having the characteristics, or some of them, hereinbefore set forth. The grade hardness of the article is or may be very high. Furthermore, by using a fine grit size of diamond grain, a very excellent finish is achieved. The grinding wheels made according to the invention have definite advantages over artificial resin bonded diamond grinding wheels for certain uses. As compared with prior resinous bonded diamond grinding wheels, a grinding wheel constructed in accordance with the invention has certain marked advantages for grinding certain materials, such as the cemented carbides. For example, under certain conditions, as in internal grinding, a wheel made according to the present invention will cut more freely, hold its shape better and perform the grinding operation in a less time. Although it is not to be expected that the relative improvement will be maintained in all cases, in so much as there are many variables involved in grinding, nevertheless in a particular internal grinding job it has been found that a wheel made in accordance with the present invention will cut five times as fast as a certain resinous bonded diamond grinding wheel according to the prior art. For example, the tenacity of the bond with respect to the diamond granules is superior in a wheel made according to this invention. Furthermore, its wearing qualities are better. We believe that we are the first successfully to bond diamond granules with a ceramic bond, while maintaining the diamond granules unburned or unoxidized, at least to any detrimental extent.

While there is no limit, so far as we are aware, to the size of the articles which can be made according to the present invention, nevertheless on account of the cost of diamond particles, in the present market, the invention will naturally be embodied in the smaller type of articles.

It will thus be seen that there has been provided by this invention a method and an article in which the various objects hereinbefore set forth together with many thoroughly practical advantages are successfully achieved. As various possible embodiments might be made of the mechanical features of the above invention and as the art herein described might be varied in various parts, all without departing from the scope of the invention, it is to be understood that all matter hereinabove set forth is to be interpreted as illustrative and not in a limiting sense.

We claim:

1. Method of bonding diamond granules to form a vitrified abrasive article which comprises mixing the diamonds with a ceramic material, and burning in the neighborhood of 1000° C. or below in an atmosphere of carbon monoxide.

2. Method of bonding diamond granules to form a vitrified abrasive article which comprises mixing the diamonds with a ceramic material including a substantial amount of $B_2O_3$, and burning in a reducing atmosphere.

3. As a new article of manufacture, a grinding wheel or other abrasive article comprising diamond granules bonded with a ceramic bond which softens at in the neighborhood of 1000° C. or below.

4. Method of bonding diamond granules to form a vitrified abrasive article which comprises mixing the diamonds with a ceramic material, and burning in the neighborhood of 1000° C. or below in an atmosphere of an inert gas.

5. Method of bonding diamond granules to form a vitrified abrasive article which comprises mixing the diamonds with a ceramic material including a substantial amount of $B_2O_3$, and burning in a non-oxidizing atmosphere.

6. As a new article of manufacture, a grinding wheel or other abrasive article comprising diamond granules bonded with a ceramic bond including a substantial amount of $B_2O_3$ which has been fired in a non-oxidizing atmosphere and which itself is substantially non-reactive towards diamond at the firing temperature employed.

7. As a new article of manufacture, a grinding wheel or other abrasive article comprising unoxidized and ungraphitized diamond granules bonded at a temperature of 1000° C. or below with a fired ceramic bond including a substantial amount of $B_2O_3$.

8. Method of bonding diamond granules to form a vitified abrasive article which comprises mixing the diamonds with a ceramic material, and burning in an atmosphere of nitrogen.

ROBERT H. LOMBARD.
LOWELL H. MILLIGAN.